(12) United States Patent
Wang

(10) Patent No.: US 11,635,525 B2
(45) Date of Patent: Apr. 25, 2023

(54) METHOD FOR DETECTING LOSS-OF-LOCK OF A GNSS SIGNAL TRACKING LOOP BASED ON FREQUENCY COMPENSATION

(71) Applicant: NANJING LOW POWER IC TECHNOLOGY INSTITUTE CO., LTD., Nanjing (CN)

(72) Inventor: Qiang Wang, Nanjing (CN)

(73) Assignee: NANJING LOW POWER IC TECHNOLOGY INSTITUTE CO., LTD., Nanjing (CN)

( * ) Notice: Subject to any disclaimer, the term of this patent is extended or adjusted under 35 U.S.C. 154(b) by 378 days.

(21) Appl. No.: 17/137,445

(22) Filed: Dec. 30, 2020

(65) Prior Publication Data

US 2021/0149059 A1 May 20, 2021

(30) Foreign Application Priority Data

Sep. 8, 2020 (CN) .......................... 202010933409.4

(51) Int. Cl.
| | |
|---|---|
| *G01S 19/24* | (2010.01) |
| *G01S 19/29* | (2010.01) |
| *G01S 19/37* | (2010.01) |
| *G01S 19/30* | (2010.01) |

(52) U.S. Cl.
CPC ............ *G01S 19/246* (2013.01); *G01S 19/24* (2013.01); *G01S 19/243* (2013.01); *G01S 19/29* (2013.01); *G01S 19/30* (2013.01); *G01S 19/37* (2013.01)

(58) Field of Classification Search
CPC ........ G01S 19/23; G01S 19/24; G01S 19/246; G01S 19/29; G01S 19/30; G01S 19/37
See application file for complete search history.

(56) References Cited

U.S. PATENT DOCUMENTS

| | | | |
|---|---|---|---|
| 6,532,251 B1 * | 3/2003 | King ...................... | G01S 19/24 |
| | | | 375/E1.007 |
| 2005/0147191 A1 * | 7/2005 | Geier .................... | G01S 19/235 |
| | | | 342/357.29 |

(Continued)

FOREIGN PATENT DOCUMENTS

CN 102176034 A * 9/2011

*Primary Examiner* — Bernarr E Gregory
*Assistant Examiner* — Fred H Mull
(74) *Attorney, Agent, or Firm* — CBM Patent Consulting, LLC

(57) ABSTRACT

A method is for detecting loss-of-lock of a GNSS (Global Navigation Satellite System) signal tracking loop based on frequency compensation, comprising the following steps of: performing multi-channel frequency compensation on I-channel and Q-channel signals after down-conversion, pseudo-code stripping and integration clearing; then, performing coherent integration and non-coherent integration for a fixed time, and taking a maximum value of non-coherent integration results as a signal value; performing parabolic interpolation frequency identification, and taking an average value of the non-coherent integration results with the frequency differences of +/−50 Hz and +/−100 Hz as a noise value; and finally, calculating a ratio of the signal value to the noise value, and performing loss-of-lock detection with the ratio as a detection volume.

5 Claims, 3 Drawing Sheets

(56) References Cited

U.S. PATENT DOCUMENTS

2010/0134354 A1\* 6/2010 Lennen ................... G01S 19/33
          342/357.73
2015/0301188 A1\* 10/2015 Broderick ............... G01S 19/23
          342/357.68

\* cited by examiner

METHOD FOR DETECTING LOSS-OF-LOCK OF A GNSS SIGNAL TRACKING LOOP BASED ON FREQUENCY COMPENSATION

This application claims priority to Chinese Patent Application Ser. No. CN202010933409.4 filed on 8 Sep. 2020.

FIELD OF TECHNOLOGY

The invention belongs to the technical field of GNSS (Global Navigation Satellite System) satellite communication, and particularly relates to a method for detecting loss-of-lock of a GNSS signal tracking loop based on frequency compensation.

BACKGROUND

In recent years, satellite navigation and positioning systems have developed rapidly. There is an increasing number of GNSS receivers installed in vehicle-mounted and handheld devices, which provide high-accuracy, real-time and all-weather navigation and positioning services that greatly meet people's positioning, navigation and timing requirements. However, a premise behind the ability of a user to acquire continuous, accurate position, velocity, and time information is that GNSS receivers are able to accurately track satellite signals.

Generally speaking, most GNSS receivers will inevitably be applied in indoor, forest valley, urban and other complex environments (collectively referred to as indoor environment), especially for ordinary handheld users, almost all of them are located in urban areas and indoors. In the above environment, GNSS satellite signals may be attenuated to different degrees with different obstacles. Research results show that wood buildings can attenuate signals by 10 dB, ordinary walls can attenuate signals by 25 dB, and reinforced concrete structure walls can attenuate signals to a greater extent. In addition, multipath interference is serious in indoor and urban environments, and receiver antennas receive signals directly from the direction of a satellite and also receive signals reflected by other objects. Since the direct wave and the reflected wave have different paths, the signal is deformed, and a measurement error, that is, a multipath effect, is generated.

Therefore, the GNSS signal in indoor environment, compared with that in the common environment, has greater attenuation of signal power, and the received signal contains greater interference, inevitably leading to distortion of signal amplitude, code phase and carrier phase tracked by a receiver loop. If the tracking loop of the GNSS receiver cannot produce the carrier phase and code phase matched with a direct satellite signal, the pseudo-range and Doppler observed quantity of the GNSS receiver will inevitably contain large unpredictable errors, causing great reduction in positioning accuracy of the receiver, and even a positioning deviation of several hundred meters or several thousand meters. It is very important for normal operation of the receiver to judge whether the tracking loop operates in a locked state in time and accurately. Early judgment of the loss-of-lock of the loop can effectively avoid the use of problematic observed quantity for positioning. However, misjudgment that the tracking loop losses lock or is being locked can cause the wrong observed quantity to enter a user positioning process, thereby completely reducing the performance of the GNSS receiver. Existing methods such as a carrier-to-noise ratio, correlator output power, phase-locked loop I/O output vector jitter and frequency-locked loop jitter cannot effectively overcome the influence of signal attenuation and interference, so finding a suitable loss-of-lock detection method has become a key issue in design of the GNSS receiver tracking loop.

SUMMARY

Object of the invention: to solve the above problems, the present invention proposes a method for detecting loss-of-lock of a GNSS signal tracking loop based on frequency compensation, in which multi-channel frequency compensation is performed on I-channel and Q-channel signals after down-conversion of input intermediate frequency signals and pseudo-code stripping, and the carrier-to-noise ratio and signal sensitivity are improved by using coherent integration and non-coherent integration, a signal value and a noise value are extracted from frequency identification output, and a ratio of the signal value to the noise value is taken as a basis for loss-of-lock judgment.

Technical solution: in order to achieve the object of the invention, the technical solution adopted by the invention is as follows: a method for detecting loss-of-lock of a GNSS signal tracking loop based on frequency compensation comprises the following steps of:

(1) performing multi-channel frequency compensation on I-channel and Q-channel signals after down-conversion and pseudo-code stripping;

(2) performing coherent integration and non-coherent integration for a fixed time, and finding out a maximum value after the non-coherent integration as a signal value;

(3) performing parabolic interpolation frequency identification to solve frequency corresponding to the signal value; and (4) with an average value of non-coherent integration results with the frequency differences relative to the signal value of +/−50 Hz and +/−100 Hz as a noise value, and a ratio of the signal value to the noise value as a detection volume, performing loop loss-of-lock detection.

Further, prior to the step (1), the method further comprises:

(1.1) subjecting an input intermediate frequency sign to carrier wave mixing and multiplication to achieve down-conversion, wherein the input intermediate frequency signal is multiplied with a sine signal to form an I-channel signal and a cosine signal to form a Q-channel signal;

(1.2) multiplying mixed signals of I-channel and Q-channel by a C/A code respectively to strip a pseudo code; and (1.3) filtering out high frequency noise in the I-channel and Q-channel signals by an integration clearer.

Further, in the step (1), a multi-channel frequency compensation strategy is such that a small compensation interval is adopted at a small frequency compensation value and a large compensation interval is adopted at a large frequency compensation value.

Further, in the step (4), the loop loss-of-lock detection specifically comprises the steps of:

(4.1) when the ratio is greater than a ratio threshold value, considering that the loop does not loss lock, tracking normally, updating a carrier phase and a code phase, and clearing the number of loss-of-lock;

(4.2) when the ratio is less than the ratio threshold value, storing the ratio in a cache and increasing the number of failures by 1;

(4.3) calculating a carrier-to-noise ratio and judging whether the carrier-to-noise ratio is less than a minimum carrier-to-noise ratio, if so, judging that the loop losses lock, stopping updating the carrier phase and the code phase, and entering a recapture process; if not, proceeding to step (4.4);

(4.4) judging whether the number of failures is less than 2, if so, judging that the loop is stable, and updating the carrier phase and the code phase normally; if not, proceeding to step (4.5); and (4.5) determining whether an average value the two ratios is less than the ratio threshold value, if so, considering that the loop losses lock, and entering recapture; if not, considering the loop stable.

Further, in the step (3), the parabolic interpolation method specifically comprises the steps of:

taking a discrete point value of a nearest point as a frequency estimation value, and given coordinates of $L(x_1, y_1)$, $M(x_2, y_2)$ and $R(x_3, y_3)$ points, horizontal and vertical coordinates of a maximum point $E(x_0, y_0)$ are as follows:

$$x_0 = \frac{(y_3 - y_1)d}{2(2y_2 - y_1 - y_3)} + x_2$$

$$y_0 = \frac{(y_3 - y_1)^2}{8(2y_2 - y_1 - y_3)} + y_2$$

where, M point is a point corresponding to the maximum value of non-coherent integration results, and L and R points are the nearest points on the left and right sides of the M point.

The invention has the beneficial effects that the method for detecting the loss-of-lock of the GNSS signal tracking loop based on the frequency compensation can accurately calculate the signal value and the noise value, and then judge the stability of the loop. According to the invention, by performing multi-channel frequency compensation on I-channel and Q-channel signals after down-conversion of input intermediate frequency signals and pseudo-code stripping, with a strategy of adopting a small compensation interval at a small compensation frequency value and a large compensation interval at a large frequency compensation value, the contradiction between fineness and the compensation range is balanced.

Coherent integration and non-coherent integration are used to improve the carrier-to-noise ratio and signal sensitivity, the maximum value and the noise value are extracted from the frequency identification output, and the ratio of the maximum value and the noise value is taken as the basis for judging the loss-of-lock. A parabolic interpolation method is used for refined frequency identification, and the discrete point value of the closest point is directly taken as the frequency estimation value, thus improving the carrier tracking accuracy.

According to multiple parameter selection and actual test results of the tracking loop, a threshold is selected as a loss-of-lock threshold value; and at the same time, the carrier-to-noise ratio is taken as another judgment basis to speed up the judgment of loop loss-of-lock, so as to meet different performance requirements.

DESCRIPTION OF THE EMBODIMENTS

The technical solution of the present invention will be further explained with reference to the drawings and embodiments below.

Figure 1:
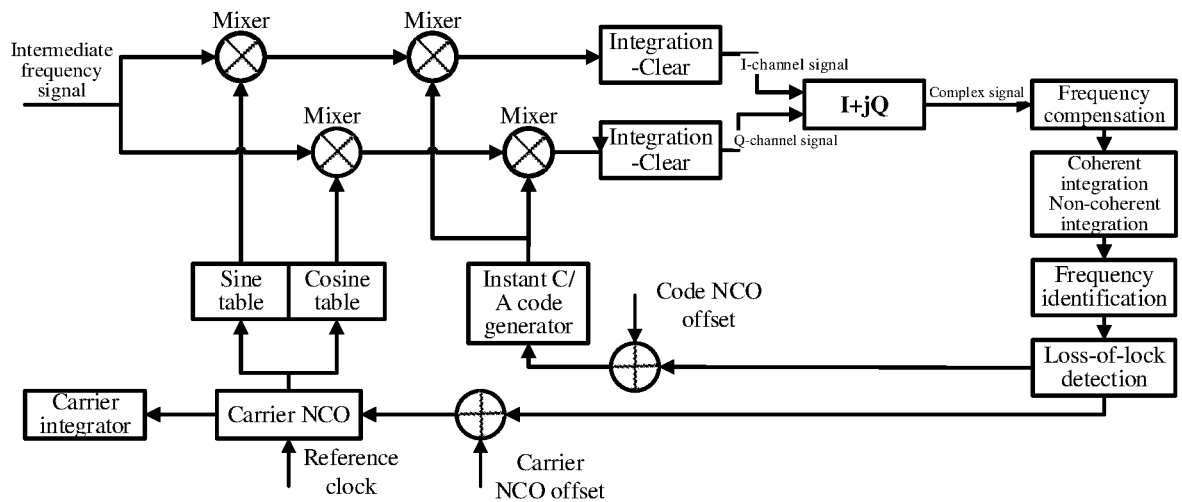
FIG. 1 is a structural diagram of a carrier tracking loop for loss-of-lock detection based on frequency compensation of the present invention.

As shown in FIG. 1, a method for detecting loss-of-lock of a GNSS signal tracking loop based on frequency compensation comprises according to the present invention comprises the following steps.

(1) Perform multi-channel frequency compensation on complex signals of I-channel and Q-channel signals after down-conversion and pseudo-code stripping, so as to effectively resist frequency difference loss caused by coherent integration.

In the GNSS signal tracking loop, the digital intermediate frequency signal as an input is first subjected to mixing multiplication with a carrier copied by a carrier loop of a GNSS receiver to achieve down-conversion, wherein the digital intermediate frequency signal is multiplied with a sine signal to form an I-channel signal and a cosine signal to form a Q-channel signal.

Then, mixed signals on the I-channel and the Q-channel are subjected to correlation operation with a C/A code copied by a GNSS receiver code loop to strip pseudo codes in the signals; and correlation results are filtered by an integration clearer to remove high frequency components and noise in the I-channel and Q-channel signals, so as to improve the signal-to-noise ratio.

(2) Perform coherent integration and non-coherent integration for a fixed time to improve the signal-to-noise ratio and tracking sensitivity, and find out a maximum value of results after the non-coherent integration as a signal value.

(3) Perform parabolic interpolation frequency identification to solve frequency corresponding to the signal value.

Figure 2:
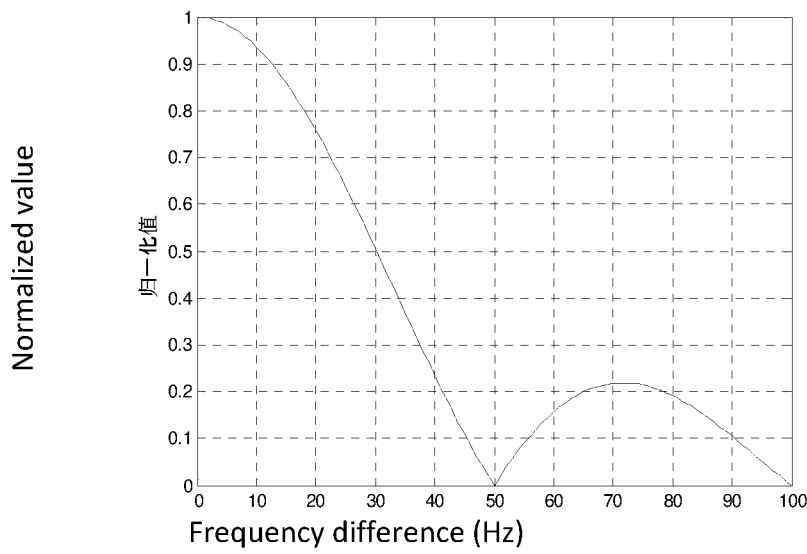
FIG. 2 is a graph showing the relationship between a 20 millisecond coherent integration result and a frequency error of the present invention.

A data bit of GPS and Beidou satellite signals is 20 millisecond long, so it is usually necessary to accumulate an integration-clearing result of 1 millisecond for 20 times, that is, coherent integration. As shown in FIG. 2, a coherent integration result for 20 milliseconds will be attenuated due to the presence of frequency error. When the frequency error is 50 Hz and 100 Hz, the coherent integration result of the signal is 0, which shows pure noise and no useful signal. Therefore, frequency compensation shall necessarily be carried out before coherent integration to offset the attenuation of coherent integration caused by frequency difference.

Figure 3:
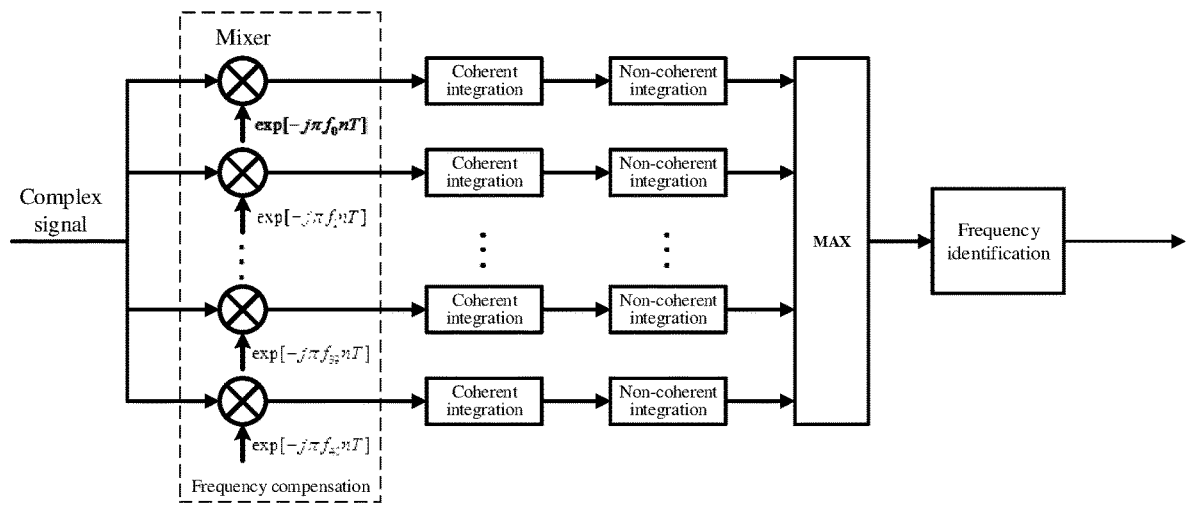
FIG. 3 is a structural diagram of 41 channels of frequency compensation, and coherent integration and non-coherent integration processing according to the present invention.

As shown in FIG. 3, since a frequency error value cannot be accurately predicted before coherent integration, it is necessary to perform multi-channel frequency compensation on the input complex signal (I+j*Q), and each channel is set with a different frequency value; at this time, a frequency value of the channel with the largest result after the coherent integration is closest to an actual frequency error. There is a contradiction between a compensation range and compensation accuracy since the number of frequency compensation channels is fixed due to the limitation of computation. Therefore, it is necessary to choose an appropriate frequency compensation interval according to the frequency error range and frequency identification accuracy. According to the invention, with a strategy of adopting a small compensation interval at a small compensation frequency value and a large compensation interval at a large frequency compensation value, the contradiction between fineness and the compensation range is balanced.

According to the invention, a total of 41 channels of frequency compensation are selected to cover a frequency range of +/−110 Hz. Selected frequency compensation points are as follows: −110, −102, −94, −86, −78, −70, −62, −54, −46, −38, −30, −26, −22, −18, −14, −10, −8, −6, −4, −2 Hz for channel 1 to channel 20, respectively, 0 Hz for channel 21, and 110, 102, 94, 86, 78, 70, 62, 54, 46, 38, 30, 26, 22, 18, 14, 10, 8, 6, 4, 2 Hz for channel 22 to channel 41, respectively. After frequency compensation of each channel, 20 ms coherent integration and 96 non-coherent integrations are performed for the same time, finally, a maximum value of non-coherent integration results in these 41 channels is found out and taken as the signal value.

Because the interval in frequency compensation is not small enough, a maximum error between the frequency compensation value at the maximum power of non-coherent integration and an actual frequency error value is half of a frequency interval. In order to accurately estimate the frequency error, it is necessary to interpolate frequency compensation points near the maximum value. After considering the accuracy and computation of an interpolation algorithm, this method chooses parabolic interpolation to estimate the frequency error.

Figure 4:
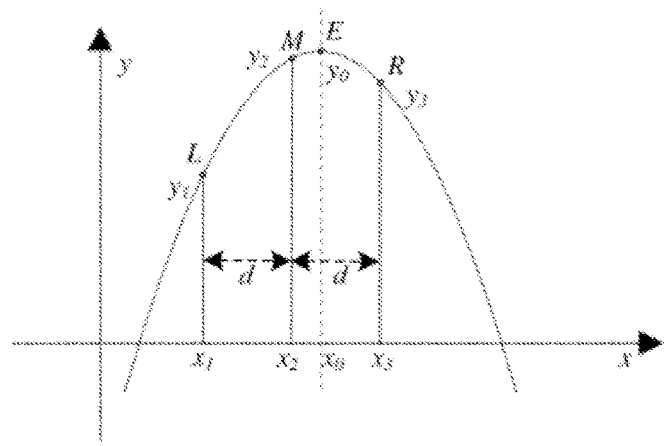
FIG. 4 is a schematic diagram of a refined frequency estimation algorithm of the present invention.

A parabolic interpolation method is used for refined frequency identification, and the discrete point value of the closest point is directly taken as the frequency estimation value, thus improving the carrier tracking accuracy. As shown in FIG. 4, given the coordinates of $L(x_1,y_1)$, $M(x_2,y_2)$ and $R(x_3,y_3)$ points, where M point is a point corresponding to the maximum value of non-coherent integration results in 41 channels, and L and R points are the nearest points on the left and right sides of M point, then the horizontal and vertical coordinates of a maximum point $E(x_0,y_0)$ are as follows:

$$x_0 = \frac{(y_3 - y_1)d}{2(2y_2 - y_1 - y_3)} + x_2$$

$$y_0 = \frac{(y_3 - y_1)^2}{8(2y_2 - y_1 - y_3)} + y_2$$

By the parabolic interpolation method, refined frequency identification is performed on the maximum value of non-coherent integration results.

(4) With an average value of non-coherent integration results with the frequency differences relative to the signal value of +/−50 Hz and +/−100 Hz as a noise value, and a ratio of the signal value to the noise value as a detection volume, perform loop loss-of-lock detection; after the judgment is passed, normally update a carrier phase and a code phase; and when the judgment fails, stop updating the carrier phase and the code phase, and enter a satellite signal recapture process.

Figure 5:
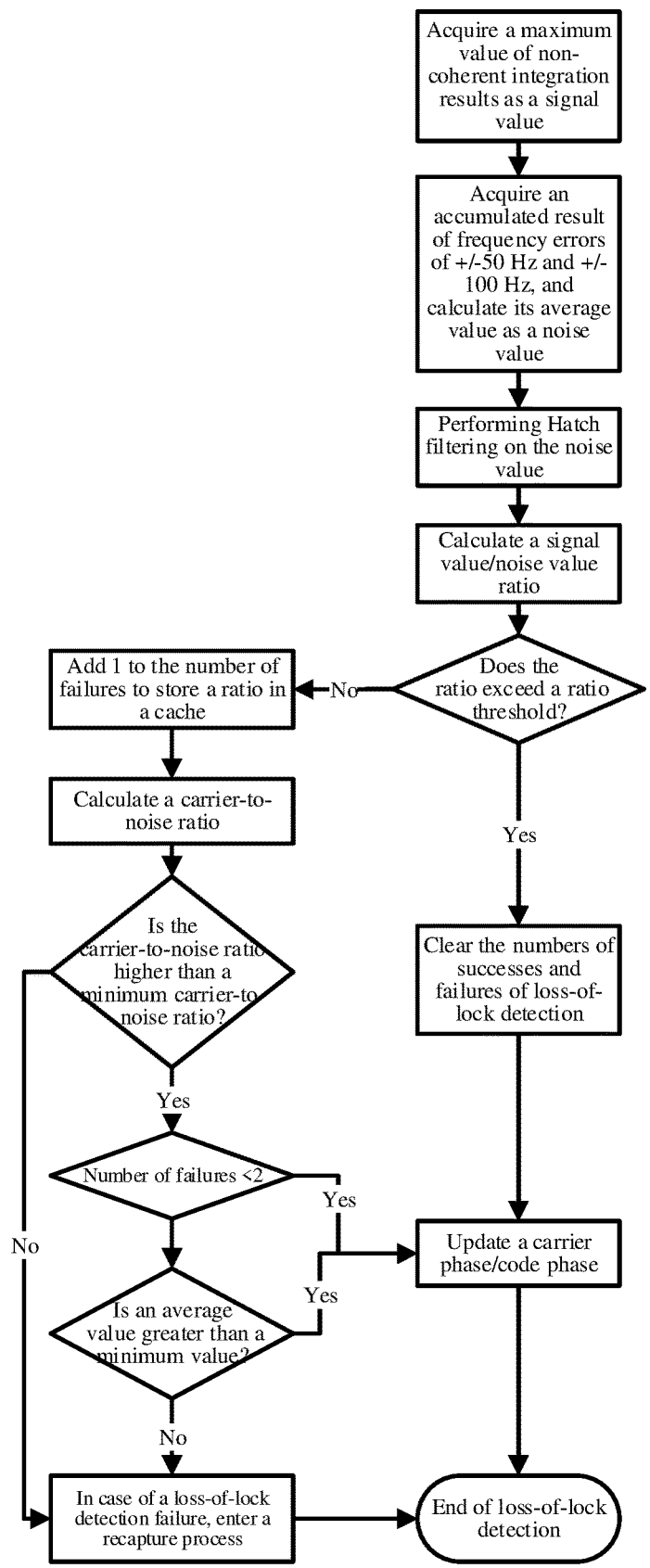
FIG. 5 is a flowchart of loss-of-lock judgment of the present invention.

As shown in FIG. 5, in the present invention, the maximum value of non-coherent integration of 41 channels of frequency compensation is taken as a signal value, the frequency value corresponding to the maximum value is taken as a frequency error, and the average value of non-coherent integration results which are different from the frequency error by +/−50 Hz and +/−100 Hz is taken as a noise value, and the noise value is subjected to Hatch filtering smoothing.

In a loop loss-of-lock detection link, the ratio between the maximum value of non-coherent integration and the average value of the non-coherent integration results with the frequency error of +/−50 Hz and +/−100 Hz is taken as a measured value to be compared with the threshold value.

According to multiple parameter selection and actual test results of the tracking loop, a threshold is selected as a loss-of-lock threshold value; and at the same time, the carrier-to-noise ratio is taken as another judgment basis to speed up the judgment of loop loss-of-lock, so as to meet different performance requirements.

According to the invention, the ratio between the signal value and the noise value is taken as an important detection volume for loop loss-of-lock judgment, which specifically comprises the following steps: when the ratio is greater than a ratio threshold value, considering the loop to be not loss lock, normally tracking, updating a carrier phase and a code phase, and clearing out the number of loss-of-lock; when the ratio is less than the threshold value, storing the ratio in a cache and adding the number of failures by 1; then further judging whether the carrier-to-noise ratio is less than the minimum carrier-to-noise ratio, if so, directly judging that the loop losses lock, stopping updating the carrier phase and the code phase, and entering a recapture process; if not, judging whether the number of failures is less than 2; if so, judging that the loop is stable and updating the carrier phase and the code phase normally; if not, judging whether the average value of the two ratios is less than a minimum threshold value; if so, considering the loop losses lock and entering recapture; if not, considering the loop stable.

It can be seen from the above that the innovation of the present invention lies in using the ratio between the maximum value of non-coherent integration after frequency compensation of 41 channels and the average value of non-coherent integration results with frequency errors of 50 Hz and +/−100 Hz as an important judgment basis for loop loss-of-lock, and this method avoids abnormality in observed quantity in signal weak or even invisible environment by means of averaging values in twice detection. Moreover, this method can speed up the loop loss-of-lock interpretation in combination with the carrier-to-noise ratio to meet different performance requirements.

What is claimed is:

1. A method for detecting loss-of-lock of a GNSS signal tracking loop based on frequency compensation, characterized by comprising the steps of:
   (1) performing multi-channel frequency compensation on I-channel and Q-channel signals after down-conversion and pseudo-code stripping;
   (2) performing coherent integration and non-coherent integration for a fixed time, and finding out a maximum value after the non-coherent integration as a signal value;
   (3) performing parabolic interpolation frequency identification to solve for a frequency corresponding to the signal value; and
   (4) with an average value of non-coherent integration results with frequency differences relative to the frequency corresponding to the signal value of +/−50 Hz and +/−100 Hz as a noise value, and a ratio of the signal value to the noise value as a detection volume, performing loop loss-of-lock detection.

2. The method for detecting the loss-of-lock of the GNSS signal tracking loop based on the frequency compensation of claim 1, the step (1) further comprising:
   (1.1) subjecting an input intermediate frequency signal to carrier wave mixing and multiplication to achieve down-conversion, wherein the input intermediate frequency signal is multiplied with a sine signal to form an I-channel signal and a cosine signal to form a Q-channel signal;

(1.2) multiplying mixed signals of I-channel and Q-channel by a C/A code respectively to strip a pseudo code; and (1.3) filtering out high frequency noise in the I-channel and Q-channel signals by an integration clearer.

3. The method for detecting the loss-of-lock of the GNSS signal tracking loop based on the frequency compensation of claim 1, characterized in that, in the step (1), a multi-channel frequency compensation strategy is such that a small compensation interval is adopted at a small frequency compensation value and a large compensation interval is adopted at a large frequency compensation value.

4. The method for detecting the loss-of-lock of the GNSS signal tracking loop based on the frequency compensation of claim 1, characterized in that, in the step (4), the loop loss-of-lock detection specifically comprises the steps of:

(4.1) when the ratio of the signal value to the noise value is greater than a ratio threshold value, considering that the loop does not loss lose lock, tracking normally, updating a carrier phase and a code phase, and clearing a number of loss-of-lock failures;

when the ratio of the signal value to the noise value is less than the ratio threshold value:

(4.2) storing the ratio of the signal value to the noise value in a cache and increasing the number of loss-of-lock failures by 1;

(4.3) calculating a carrier-to-noise ratio and judging whether the carrier-to-noise ratio is less than a minimum carrier-to-noise ratio, if so, judging that the loop losses lock, stopping updating the carrier phase and the code phase, and entering a recapture process; if not, proceeding to step (4.4);

(4.4) judging whether the number of loss-of-lock failures is less than 2, if so, judging that the loop is stable, and updating the carrier phase and the code phase normally; if not, proceeding to step (4.5); and (4.5) determining whether an average value of the ratio of the signal value to the noise value and the carrier-to-noise ratio is less than the ratio threshold value, if so, considering that the loop losses lock, and entering recapture; if not, considering the loop stable.

5. The method for detecting the loss-of-lock of the GNSS signal tracking loop based on the frequency compensation of claim 1, characterized in that, in the step (3), a parabolic interpolation method is specifically as follows:

taking a discrete point value of a nearest point as a frequency estimation value, and given coordinates of $L(x_1,y_1)$, $M(x_2,y_2)$ and $R(x_3,y_3)$ points, horizontal and vertical coordinates of a maximum point $E(x_0,y_0)$ are as follows:

$$x_0 = \frac{(y_3 - y_1)d}{2(2y_2 - y_1 - y_3)} + x_2$$

$$y_0 = \frac{(y_3 - y_1)^2}{8(2y_2 - y_1 - y_3)} + y_2$$

where, M point is a point corresponding to the maximum value of non-coherent integration results, and L and R points are the nearest points on the left and right sides of the M point.

* * * * *